US010659115B1

(12) United States Patent
Marupaduga et al.

(10) Patent No.: US 10,659,115 B1
(45) Date of Patent: May 19, 2020

(54) DYNAMIC ANTENNA CALIBRATION SCHEDULING

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/218,888

(22) Filed: Dec. 13, 2018

(51) Int. Cl.
*H04B 17/00* (2015.01)
*H04B 7/0452* (2017.01)
*H04W 24/10* (2009.01)
*H04B 17/11* (2015.01)

(52) U.S. Cl.
CPC ........... *H04B 7/0452* (2013.01); *H04B 17/11* (2015.01); *H04W 24/10* (2013.01)

(58) Field of Classification Search
CPC ...... H04B 7/0452; H04B 17/11; H04W 24/10
See application file for complete search history.

(56) References Cited

U.S. PATENT DOCUMENTS

| 10,056,992 | B1* | 8/2018 | Marupaduga | ............ H04B 1/18 |
| 2006/0240784 | A1* | 10/2006 | Naguib | .................. H01Q 3/267 455/73 |
| 2012/0208584 | A1* | 8/2012 | Liao | ....................... H04B 17/12 455/509 |
| 2014/0086077 | A1* | 3/2014 | Safavi | .................... H04W 24/02 370/252 |
| 2016/0183209 | A1* | 6/2016 | Inoue | ....................... H04B 17/12 375/362 |
| 2019/0013566 | A1* | 1/2019 | Merrell | ................. H01Q 1/1257 |
| 2019/0386752 | A1* | 12/2019 | Zhou | ....................... H04B 17/12 |

* cited by examiner

*Primary Examiner* — Dac V Ha (57) ABSTRACT

Methods and systems are provided for dynamically delaying a calibration of an antenna. It is determined that there is a quantity of user devices above a predetermined threshold on a particular sector of an antenna associated with the base station, or that there is a quantity of user devices above a predetermined threshold in an MU-MIMO group on the particular sector of the antenna. Further, it is determined that there is an upcoming scheduled calibration event of the antenna, and based on the upcoming scheduled calibration event and the occurrence, the upcoming scheduled calibration event of the antenna is delayed or postponed.

18 Claims, 4 Drawing Sheets

DYNAMIC ANTENNA CALIBRATION SCHEDULING

SUMMARY

The present disclosure is directed, in part, to dynamically delaying an upcoming calibration event of an antenna. For instance, when particular criteria associated with the base station has been met, calibration may be delayed. In some aspects, in general, when loading is high on a particular sector of an antenna, calibration of that antenna (e.g., a change of phase) would be detrimental to the user experience. Network performance and coverage for those user devices would be impacted. To avoid this, aspects herein provide for dynamically delaying a calibration event when loading is high. In particular, calibration may be delayed when there is a grouping of user devices utilizing multiple user multiple input multiple output (MU-MIMO) technology. Or, calibration could be delayed when the quantity of user devices in that group utilizing MU-MIMO technology exceeds a particular threshold. Still yet, calibration could be delayed when user devices utilizing single user multiple input multiple output (SU-MIMO) technology exceed a particular threshold. In some cases, two or more criteria would be met to trigger a delay of a calibration event.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for delaying a scheduled calibration event when certain criteria are met. Antennas are regularly calibrated to provide for optimal performance when sending and receiving data to and from various devices. However, when calibration of an antenna does occur, the phase of the antenna may change which could impact performance and coverage of user devices transmitting and receiving information from that particular antenna. Because of this, embodiments described herein delay or postpone an upcoming scheduled calibration event. When an upcoming scheduled calibration event is delayed, the process described herein could occur again, until the criteria for delaying calibration has not been met. Optimally, calibration would be delayed until loading on a sector is minimal, such as when there is not a grouping of user devices using MU-MIMO or when the number of user devices using SU-MIMO is below a threshold.

In some aspects, the system may delay calibration upon the occurrence of an event corresponding to loading at a particular sector. For example, if the number of user devices associated with a particular sector is above a predetermined threshold, it may be determined, such as by the base station or some other network component, to delay calibration of the antenna. More specifically, if the base station is configured for MIMO, and specifically for MU-MIMO, if there is presently a grouping of user devices utilizing MU-MIMO, calibration may be delayed. Alternatively or additionally, if there are multiple user devices on the sector utilizing single user MIMO (SU-MIMO) and that number of user devices exceeds a predetermined or threshold amount, calibration may be delayed. In some aspects, the system may require both a grouping of user devices utilizing MU-MIMO, which could be a threshold number of user devices in that grouping, and a threshold number of user devices utilizing SU-MIMO in a particular sector.

There are several advantages to delaying calibration in the instances described above. For instance, because there isn't any phase change, as there would be during calibration, data transmission is not interrupted, amounting to a better user experience. Network performance and user device coverage also would not be impacted, which could occur during calibration.

As used herein, MIMO refers to a wireless technology that employs multiple intelligent radio antennas to improve transmission speed and quality of wireless networks over longer distances. MU-MIMO, as used herein, refers to a set of multiple-input and multiple-output technologies for wireless communication, where a set of user devices, each with at least one antenna, communicates with each other. MU-MIMO supports multiple wireless users simultaneously. SU-MIMO, as used herein, refers to a multi-transmitter/receiver technology (MIMO) that allocates the full bandwidth of the cell site to a single device during an allotted time slot.

In a first aspect, one or more computer-readable media having computer-executable instructions embodied thereon are provided that, when executed, perform a method for dynamically scheduling a calibration of an antenna. The method includes determining that there is an occurrence, at a base station, of one or more of a quantity of user devices above a predetermined threshold on a particular sector of an antenna associated with the base station, or a quantity of user devices above a predetermined threshold in an MU-MIMO group on the particular sector of the antenna. The method further comprises determining that there is an upcoming scheduled calibration event, and based on the upcoming scheduled calibration event and the occurrence, delaying the upcoming scheduled calibration event of the antenna.

In another aspect, a method is provided for dynamically scheduling a calibration of an antenna. The method includes determining that there is an upcoming scheduled calibration event for an antenna at a base station, and based on the upcoming scheduled calibration event, determining that there is presently an occurrence of one or more of a quantity of SU-MIMO user devices above a predetermined threshold on a particular sector of the antenna associated with the base station, or a quantity of user devices above a predetermined threshold in an MU-MIMO group on the particular sector of the antenna. The method further includes, subsequent to determining that there is presently an occurrence, postponing the upcoming scheduled calibration event.

In yet another aspect, a scheduling system is provided for dynamically scheduling a calibration of an antenna. The scheduling system includes a processor and one or more computer storage hardware devices storing computer-usable instructions that, when used by the processor, cause the processor to determine that there is an upcoming scheduled calibration event for an antenna at a base station. Further, the instructions cause the processor to, based on the upcoming scheduled calibration event, determine that there is presently an occurrence of one or more of loading on a sector of the antenna that is above a predetermined threshold, or a quantity of user devices above a predetermined threshold in an MU-MIMO grouping on a sector of the antenna. Additionally, the instructions cause the processor to postpone the upcoming scheduled calibration event.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprises computer-storage media and communications media.

Computer-storage media, or machine-readable media, include media implemented in any method or technology for storing information. Examples of stored information include computer-useable instructions, data structures, program modules, and other data representations. Computer-storage media includes, but is not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example but not limitation, communications media includes wired media, such as a wired network or direct-wired connection, and wireless media such as acoustic, infrared, radio, microwave, spread-spectrum, and other wireless media technologies. Combinations of the above are included within the scope of computer-readable media.

Figure 1:
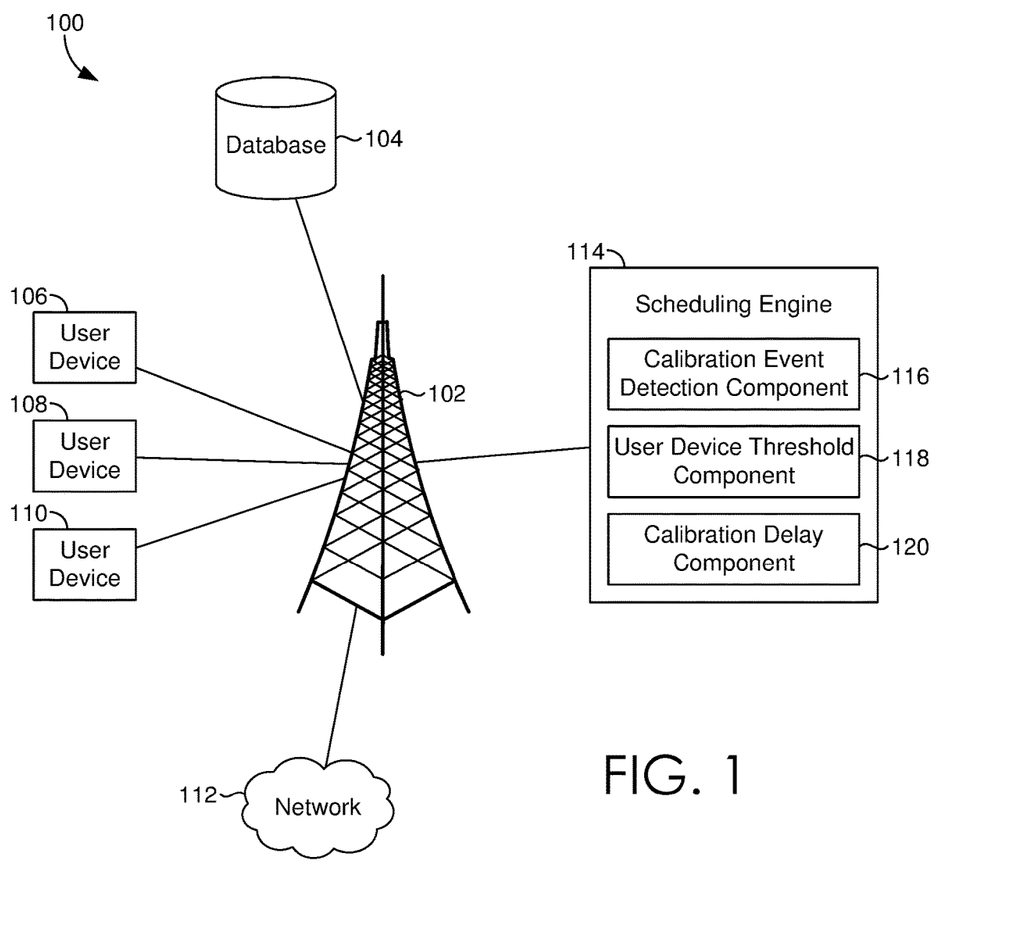
FIG. 1 depicts a diagram of an exemplary network environment suitable for use in implementations of the present disclosure.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes multiple user devices (items 106, 108, and 110), cell site 102, network 112, database 104, and scheduling engine 114. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

Figure 4:
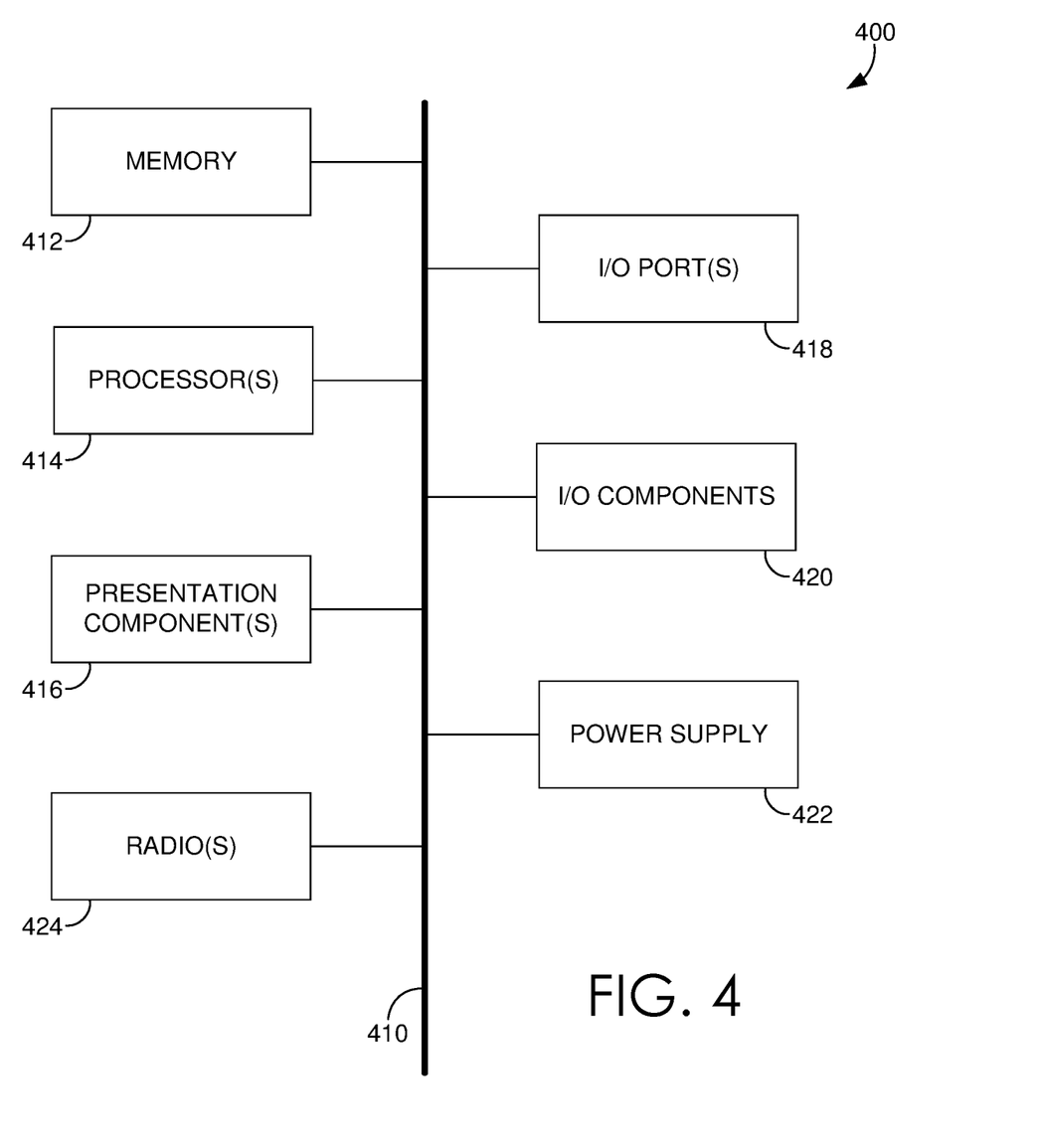
FIG. 4 depicts an exemplary computing environment suitable for use in implementation of the present disclosure.

In some aspects, the user devices (items 106, 108, and 110) can correspond to computing device 400 in FIG. 4. Thus, a user device can include, for example, a display(s), a power source(s) (e.g., a battery), a data store(s), a speaker(s), memory, a buffer(s), a radio(s) and the like. In some implementations, a user device (items 106, 108, and 110) comprises a wireless or mobile device with which a wireless telecommunications network(s) can be utilized for communication (e.g., voice and/or data communication). In this regard, the user device can be any mobile computing device that communicates by way of a wireless network, for example, a 3G, 4G, 5G, LTE, CDMA, or any other type of network.

Figure 2:
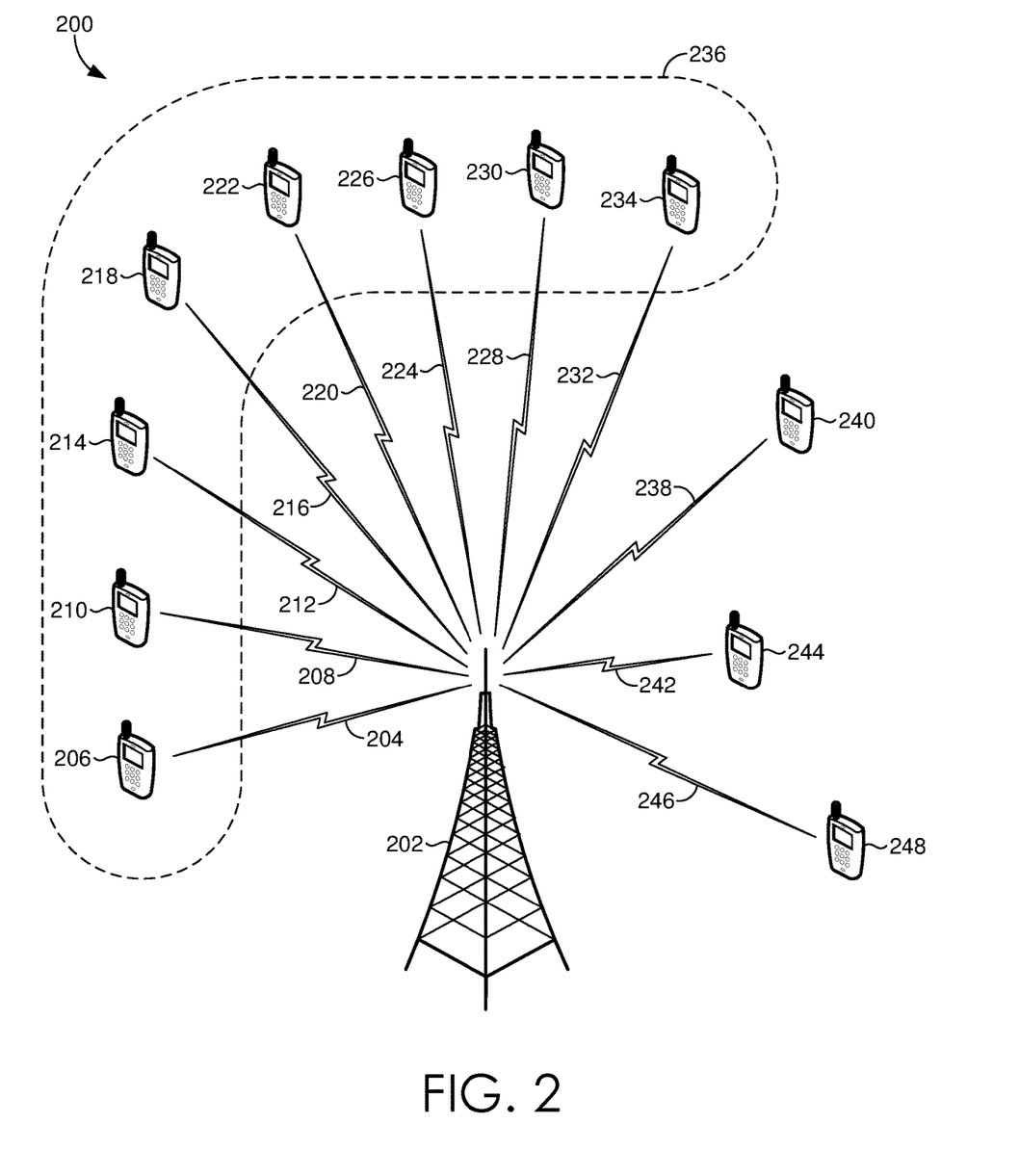
FIG. 2 illustrates a diagram of an exemplary network environment having an MU-MIMO grouping of user devices, in which implementations of the present disclosure may be employed.

In some cases, the user devices (items 106, 108, and 110) in network environment 100 can optionally utilize network 112 to communicate with other computing devices (e.g., a mobile device(s), a server(s), a personal computer(s), etc.) through cell site 102. The network 112 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 112 can include multiple networks, as well as being a network of networks, but is shown in a more simple form so as to not obscure other aspects of the present disclosure.

Network 112 can be part of a telecommunications network that connects subscribers to their immediate service provider. In some instances, network 112 can be associated with a telecommunications provider that provides services (e.g., LTE, 5G) to user devices, such as user devices 106, 108, and 110. For example, network 112 may provide voice services to user devices or corresponding users that are registered or subscribed to utilize the services provided by a telecommunications provider. Network 112 can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a combination thereof.

In some implementations, cell site 102 is configured to communicate with user devices, such as user devices 106, 108, and 110 that are located within the geographical area, or cell, covered by radio antennas of cell site 102. Cell site 102 may include one or more base stations, base transmitter stations, radios, antennas, transmitters/receivers, digital signal processors, control electronics, GPS equipment, and the like. In particular, cell site 102 may selectively communicate with the user devices using beamforming. Further, two or more user devices in the same sector, for example, may be grouped together based on spacing between the user devices and/or other criteria. In some instances, as described herein, multiple user multiple input multiple output (MU-MIMO) may be used for groupings of user devices.

MU-MIMO is a technique where the same physical air interface resources are used by multiple users in an uplink or downlink connection with a base station. Traditionally, the base station establishes uplink (or downlink) transmission with a mobile handset over a single frequency that is exclusive to that particular uplink connection (e.g., an LTE connection with an EnodeB or a 5G connection with GnodeB). In this regard, typically only one active uplink connection can occur per frequency. MU-MIMO allows multiple users to be paired for uplink over the same frequency, allowing transfer of data over the same physical air resources. This increases efficiency of use of existing resources at the cost of more expensive or intricate signal processing. For MU-MIMO to work properly, there must be at least orthogonal separation between paired mobile handsets in relation to the transmitting/receiving component.

In some aspects described herein, multiple user devices may be grouped together for MU-MIMO. In some instances, eight user devices may be grouped together, or even sixteen user devices could be grouped together. Downlink speeds increase with an increase of user devices in a particular MU-MIMO grouping. Further, some user devices on the same sector may not utilize MU-MIMO, but instead may utilize single user multiple input multiple output (SU-MIMO). In some aspects, an upcoming scheduled calibration event may be delayed or postponed when there is a grouping of user devices using MU-MIMO, when the quantity of user devices using MU-MIMO is above a threshold, or when the quantity of user devices using SU-MIMO is above a threshold. In other instances, some combination of the above criteria may be used to delay calibration. For example, calibration may be delayed when there is any group of user devices using MU-MIMO and when the quantity of user devices using SU-MIMO exceeds a threshold. But in another example, calibration could be delayed when the quantity of user devices using MU-MIMO is above a threshold and when the quantity of user devices using SU-MIMO exceeds a threshold.

When calibration is delayed, the next calibration could be performed at the next scheduled time, but even then, calibration could be delayed again if the required criteria is met. In aspects, the goal is to delay calibration until loading on a particular sector is low, or at least lower than it is during peak times. For example, during working hours on weekdays, loading may be higher on a sector, and thus it would be advantageous to delay calibration until loading has lessened. Thus, embodiments herein allow for dynamically changing when calibration is to occur.

Scheduling engine 114 includes calibration event detection component 116, user device threshold component 118, and calibration delay component 120. Generally, the scheduling engine 114 analyzes current loading at the cell site 102, such as on a particular sector, and determines whether calibration should be delayed or not. Calibration event detection component 116 communicates with database 104 and knows when the next scheduled calibration is to take place. In aspects, when there is an upcoming scheduled calibration event, calibration event detection component 116 communicates with user device threshold component 118. User device threshold component 118 may then analyze network statistics, which could be received from cell site 102, database 104, or some other network component, and determine whether the criteria has been met for delaying calibration. The user device threshold component 118 determines when there is a grouping of user devices using MU-MIMO, when the quantity of user devices using MU-MIMO is above a threshold, or when the quantity of user devices using SU-MIMO is above a threshold. In other instances, some combination of the above criteria may be used to delay calibration. Calibration delay component 120 is responsible for delaying calibration when the criteria has been met. Calibration delay component 120 may communicate with cell site 102, database 104, or some other network component through network 112 to let them know that calibration has been delayed.

Turning now to FIG. 2, another exemplary networking environment suitable for use in aspects discussed herein is provided. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

As described above, one criteria for delaying calibration is for a group of user devices to be using MU-MIMO, or for the quantity of user devices in a group to exceed a threshold number of user devices. FIG. 2 illustrates a group 236 of MU-MIMO user devices, which includes user devices 206, 210, 214, 218, 222, 226, 230, and 234. These multiple user devices in group 236 are paired for uplink over the same frequency, allowing transfer of data over the same physical air resources. The transfer of data is illustrated in FIG. 2 by communication links 204, 208, 212, 216, 220, 224, 228, and 232. Also illustrated in FIG. 2 are three user devices, 240, 244, and 248 which utilize SU-MIMO to individually communicate with cell site 202 by way of communication links 238, 242, and 246 respectively. In embodiments herein, calibration may be delayed if there is a grouping of user devices utilizing MU-MIMO, such as group 236, and/or if there is a quantity of user devices above a threshold utilizing SU-MIMO, as shown by user devices 240, 244, and 248.

Alternatively, instead of the criteria being a group 236 of user devices utilizing MU-MIMO, the criteria could be the quantity of user devices in group 236 being above a threshold. Here, eight user devices are illustrated in group 236, but other quantities, such as four, six, ten, sixteen, etc., of user devices could also be grouped together for MU-MIMO. Also, while three SU-MIMO devices are illustrated in FIG. 2, the quantity could change, and is shown here just for exemplary purposes.

Communications links, such as the wireless telecommunication links shown in FIG. 2 between each of the user devices and the cell site 202 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

Figure 3:
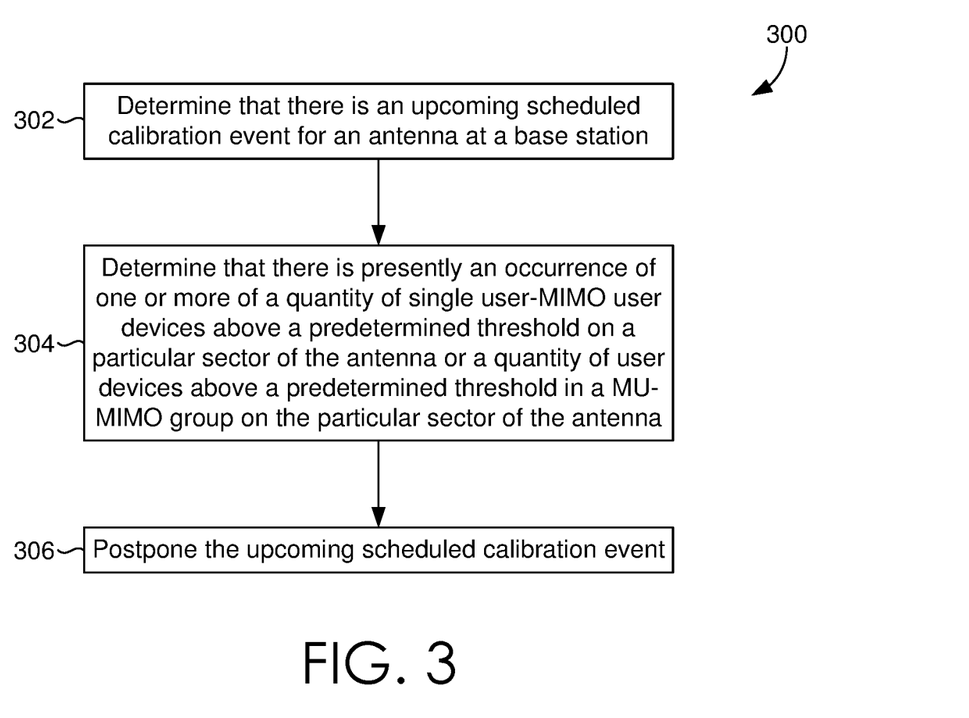
FIG. 3 depicts a flow diagram of an exemplary method for dynamically scheduling a calibration of an antenna, in accordance with implementations of the present disclosure.

FIG. 3 depicts a flow diagram of an exemplary method 300 for dynamically delaying calibration of an antenna at a cell site, in accordance with implementations of the present disclosure. Method 300 includes determining that there is an upcoming scheduled calibration event for an antenna at a base station, shown at block 302. Further, method 300 includes determining that there is presently an occurrence of a quantity of SU-MIMO user devices above a predetermined threshold on a particular sector of the antenna, and/or that there is a quantity of users above a predetermined threshold in an MU-MIMO group on that particular sector. Once this has been determined at block 304, an upcoming scheduled calibration event of the antenna may be postponed/delayed, shown at block 306.

Referring to FIG. 4, a diagram is depicted of an exemplary computing environment suitable for use in implementations of the present disclosure. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 412. Also, processors, such as one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, nonremovable, or a combination thereof. Exemplary memory includes solid-state memory, hard drives, optical-disc drives, etc. Computing device 400 includes one or more processors 406 that read data from various entities such as bus 402, memory 404 or I/O components 412. One or more presentation components 408 presents data indications to a person or other device. Exemplary one or more presentation components 408 include a display device, speaker, printing component, vibrating component, etc. I/O ports 410 allow computing device 400 to be logically coupled to other devices including I/O components 412, some of which may be built in computing device 400. Illustrative I/O components 412 include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various embodiments, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for dynamically delaying a calibration of an antenna, the method comprising:
determining that there is a quantity of user devices above a predetermined threshold in a multiple user multiple input multiple output (MU-MIMO) group on the particular sector of the antenna of a base station;
determining that there is an upcoming scheduled calibration event of the antenna; and
based on the upcoming scheduled calibration event and the quantity of user devices being above a predetermined threshold in a MU-MIMO group, delaying the upcoming scheduled calibration event of the antenna.

2. The one or more non-transitory computer-readable media of claim 1, wherein the upcoming scheduled calibration event of the antenna is delayed for a predetermined amount of time.

3. The one or more non-transitory computer-readable media of claim 2, wherein the predetermined amount of time is a time period that extends to a subsequent scheduled calibration event.

4. The one or more non-transitory computer-readable media of claim 1, wherein the antenna utilizes beamforming technology.

5. The one or more non-transitory computer-readable media of claim 1, wherein the predetermined threshold in the MU-MIMO group is eight user devices.

6. The one or more non-transitory computer-readable media of claim 1, wherein the predetermined threshold in the MU-MIMO group is sixteen user devices.

7. The one or more non-transitory computer-readable media of claim 1, wherein the upcoming scheduled calibration event is delayed until the quantity of user devices is below the predetermined threshold in the MU-MIMO group on the particular sector of the antenna.

8. The one or more non-transitory computer-readable media of claim 1, further comprising determining that there is a subsequent upcoming scheduled calibration event of the antenna.

9. The one or more non-transitory computer-readable media of claim 8, further comprising:
based on the subsequent upcoming scheduled calibration event and the quantity of user devices above the predetermined threshold in the MU-MIMO group, delaying the subsequent upcoming scheduled calibration event of the antenna.

10. A method for dynamically scheduling a calibration of an antenna, the method comprising:
determining that there is an upcoming scheduled calibration event for an antenna at a base station;
based on the upcoming scheduled calibration event, determining that there is presently an occurrence of:
1) a quantity of SU-MIMO user devices above a predetermined threshold on a particular sector of the antenna associated with the base station, and
2) a quantity of user devices above a predetermined threshold in an MU-MIMO group on the particular sector of the antenna; and
subsequent to determining that there is presently the occurrence, postponing the upcoming scheduled calibration event.

11. The method of claim 10, wherein the predetermined threshold in the MU-MIMO group is eight user devices.

12. The method of claim 10, wherein the predetermined threshold in the MU-MIMO group is sixteen user devices.

13. The method of claim 10, wherein the upcoming scheduled calibration event is postponed until the quantity of SU-MIMO user devices is above the predetermined threshold on the particular sector of the antenna associated with the base station, and the quantity of user devices is above the predetermined threshold in the MU-MIMO group on the particular sector of the antenna.

14. The method of claim 10, wherein the antenna utilizes beamforming technology.

15. A scheduling system for dynamically scheduling a calibration of an antenna, the scheduling system comprising:
a processor; and
one or more computer storage hardware devices storing computer-usable instructions that, when used by the processor, cause the processor to:
determine that there is an upcoming scheduled calibration event for an antenna at a base station;
based on the upcoming scheduled calibration event, determine that there is presently an occurrence of:
1) loading on a sector of the antenna that is above a predetermined threshold, and
2) a quantity of user devices above a predetermined threshold in an MU-MIMO grouping on a sector of the antenna; and
postpone the upcoming scheduled calibration event.

16. The scheduling system of claim 15, wherein the loading on the sector is at least, in part, user devices that are communicating with the base station by way of SU-MIMO technology.

17. The scheduling system of claim 15, wherein the upcoming scheduled calibration event is postponed until the loading on the sector of the antenna that is above the predetermined threshold and the quantity of user devices is above the predetermined threshold in the MU-MIMO grouping on the sector of the antenna.

18. The scheduling system of claim 15, wherein the upcoming scheduled calibration event of the antenna is postponed for a predetermined amount of time.

* * * * *